Figure 1:
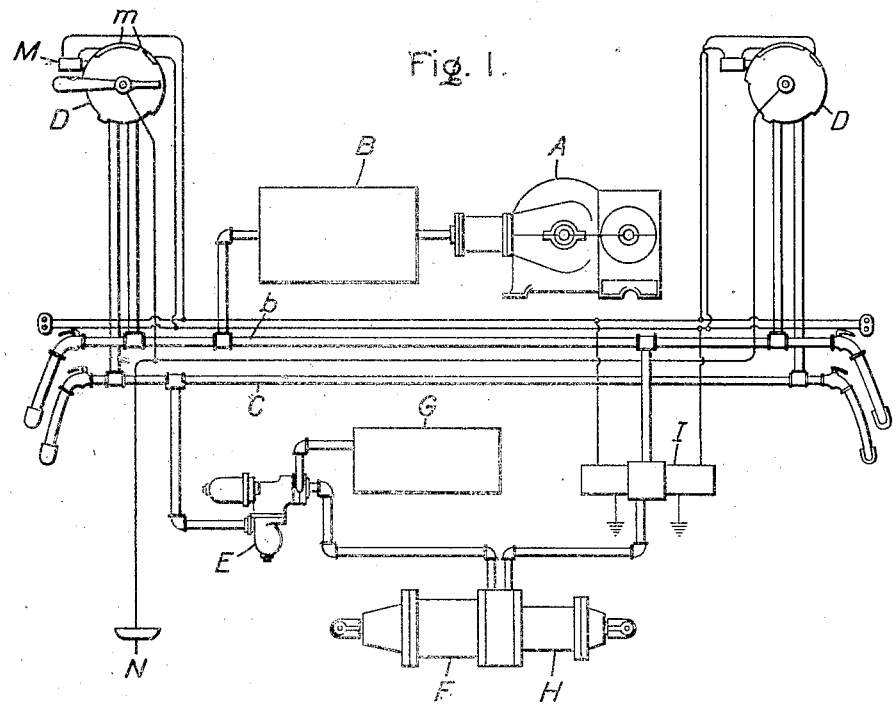

No. 843,758. PATENTED FEB. 12, 1907.
G. MACLOSKIE.
AIR BRAKE SYSTEM.
APPLICATION FILED JUNE 22, 1906.

Witnesses:
George H. Tilden.

Inventor:
George Macloskie,
by Albert G. Davis
Att'y.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

AIR-BRAKE SYSTEM.

No. 843,758.

Specification of Letters Patent.

Patented Feb. 12, 1907.

Application filed June 22, 1906. Serial No. 322,845.

*To all whom it may concern:*

Be it known that I, GEORGE MACLOSKIE, a citizen of the United States, residing at Schenectady, county of Schenectady, State of New York, have invented certain new and useful Improvements in Air-Brake Systems, of which the following is a specification.

My invention relates to air-brake systems, and particularly to systems employing two kinds of brake-controlling apparatus.

It has been proposed heretofore to arrange air-brakes with both electrically-operated and pneumatically-operated controlling devices, since electrically-operated devices have the advantage of greater rapidity in action and greater flexibility in control, while the pneumatic devices serve to give reliability in cases of emergency, such as failure of the electric current.

It is sometimes advantageous to employ separate brake-cylinders for the electric and pneumatic control systems, since the electrically-controlled cylinder may be made smaller, so as to permit taking air at a high pressure directly from the main reservoir without using a pressure-reducing valve. With such an arrangement the two systems are practically independent, each cylinder being controlled only by its own control system, and it may sometimes happen that upon failure of electric current the electric valve may be left in lap position with pressure in the brake-cylinder controlled thereby.

My invention has for its object to secure automatically the release of the pressure in the electrically-controlled cylinder when pressure is admitted to the pneumatically-controlled cylinder. Thus if on the failure of electric current the brakes should remain set due to the electrically-controlled cylinder by admitting pressure to the pneumatically-controlled cylinder the pressure in the electrically-controlled cylinder may be released, and the brakes may then be released by the pneumatically-controlled system in the usual manner.

In a former application, Serial No. 310,415, filed April 7, 1906, I have described a combined electric and pneumatic system employing a single brake-cylinder, in which in order that a single controlling-handle may be used to control both systems the pneumatic control is arranged to be rendered inoperative, while the electric control is in use, but immediately becomes operative upon the failure of electric current. When the arrangement of my former application is employed in combination with my present invention with separate cylinders for pneumatic and electric control, it will be seen that when the control-handle is moved to braking position, so as to set the brakes electrically and the current then fails, the pneumatic braking system will come automatically into operation to release the pressure from the electrically-controlled cylinder. The brakes may then be released and applied pneumatically in the usual manner.

My invention will best be understood by reference to the accompanying drawings, in which—

Figure 2:
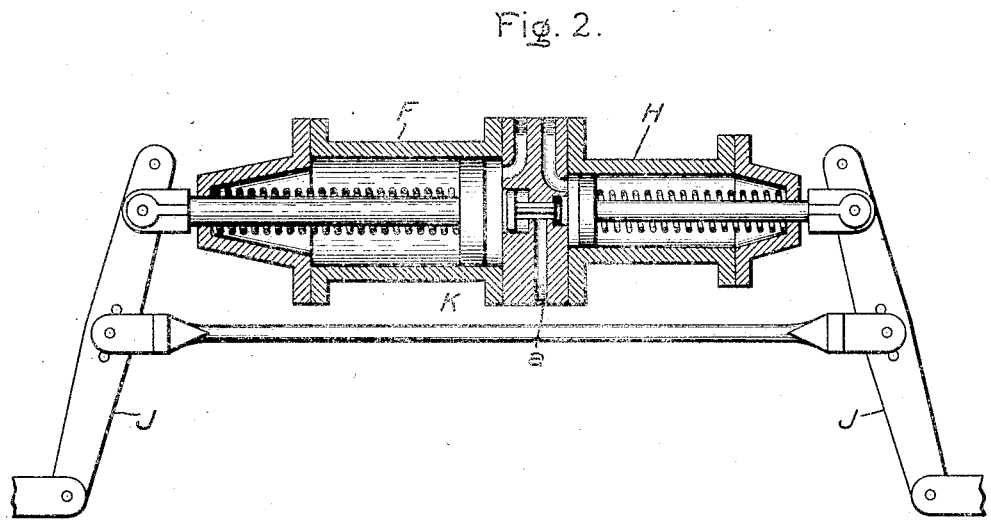

Figure 1 shows diagrammatically an air-brake system arranged in accordance with my invention, and Fig. 2 shows a cross-sectional view of the two brake-cylinders and release-valve.

In the drawings, A represents an air-compressor supplying the main reservoir B, which is connected to the main reservoir-line $b$.

C represents the usual train-pipe of an automatic air-brake system which is arranged to be connected to reservoir-line $b$ or to atmosphere through the engineer's valve D. The usual pressure-reducing valves may be employed between the reservoir-line and train-pipe line, either in conjunction with the engineer's valve or separate therefrom, so as to give a pressure in the train-pipe C lower than that in reservoir-line $b$.

E represents a triple valve which may be of the usual construction with its piston-chamber connected to train-pipe C and arranged to connect brake-cylinder F to auxiliary reservoir G or to atmosphere to apply and to release the brakes. H represents a second brake-cylinder controlled by the electrically-actuated valve I, which is arranged to connect brake-cylinder H to reservoir-line $b$ or to atmosphere to apply and to release the brakes. The construction of this electrically-operated valve is not shown, since it forms no part of my present invention, and any suitable structure, such as that described in my former application above referred to, may be employed. The electrically-actuated valve I may be conveniently controlled in accordance with the invention described in my former application by contacts m on the engineer's valve D, through which the valve I may be connected to the source of current, (indicated by the collector-shoe N.) I have indicated a device M in series with the contacts m, which may be used to close the exhaust of the engineer's valve when current is passing through it. In this manner the pneumatic control is rendered inoperative whenever the electric control is employed, as is fully described in my former application above referred to, Serial No. 310,415, in which a suitable construction of the device M is fully illustrated and described. The purpose of this arrangement as described in my former application is to enable the electric and pneumatic control to be secured by the same handle without interference between the two systems. While I believe such an arrangement to be of value and have consequently illustrated it diagrammatically in the present case, this particular arrangement is not essential to my present invention in its broader aspect and need not be described at length. It is sufficient to understand that as long as the electric system of control is used the pneumatic system is inoperative.

Now referring to Fig. 2, the arrangement of the brake-cylinders and of the release-valve will be described. The two cylinders F and H are arranged back to back, the latter cylinder being smaller than the pneumatically-controlled cylinder, since it is arranged to be connected directly to reservoir, as shown in Fig. 1, without a reducing-valve. The pistons on both cylinders are connected to the same brake-rigging J, so that the brakes are applied whenever pressure is admitted to either cylinder. A release-valve K is arranged between the two cylinders and comprises two lift-valves of unequal areas, the one exposed to the pressure in the pneumatically-controlled cylinder F being larger and close fitting in the chamber in which it moves, while the other lift-valve at the opposite end of the device, which is subjected to the pressure in the electrically-controlled cylinder H, is smaller and is loose fitting, so as to allow a comparatively free leakage of air around it when the valve is shifted toward the right from the position shown in Fig. 2. During normal operation—that is, while the brakes are being controlled electrically—the release-valve K maintains the position shown in Fig. 2, since there is no pressure in the pneumatically-controlled cylinder F, and consequently no pressure on the larger lift-valve. Now if the current in the electric-control system should fail for any cause while the cylinder H is filled with air under pressure by admitting air to cylinder F the release-valve K is shifted toward the right by the pressure on the larger lift-valve. This connects brake-cylinder H to atmospheric port a through the leakage-space around the smaller lift-valve, thereby exhausting the air from cylinder H. The brakes are maintained applied by the pressure in cylinder F; but this pressure may be released by the pneumatic control.

It will be seen that employing the contacts m and the device M, (indicated in Fig. 1,) which renders the pneumatic system inoperative as long as and only so long as the electric system is in use, the failure of the electric current while the engineer's valve is in braking position brings the pneumatic control at once into action and produces a reduction of pressure in train-pipe C, an operation of triple valve E, and an admission of air to cylinder F, so as to release the pressure in cylinder H. The transfer of control from the electric to the pneumatic system is thus automatic upon the failure of current in the same manner as in the arrangement of my former application, and the employment of the release-valve K serves effectually to prevent the electric-control system from interfering with the pneumatic control, no matter in what condition the electric-control system is left at the time of the failure of current.

I do not desire to limit myself to the particular construction and arrangement of parts here shown, but aim in the appended claims to cover all modifications which are within the scope of my invention.

What I claim as new, and desire to secure by Letters Patent of the United States, is—

1. In an air-brake system, two brake-cylinders on a car, and means for automatically releasing the pressure in one cylinder upon the admission of pressure to the other.

2. In an air-brake system, two brake-cylinders on a car, a movable member exposed to the pressure in one of said cylinders, and a valve operatively connected to said member adapted to connect the other cylinder to atmosphere.

3. In an air-brake system, two brake-cylinders on a car, two independent valves controlling the pressures in said cylinders respectively, and means for automatically releasing the pressure in one cylinder upon the admission of pressure to the other cylinder.

4. In an air-brake system, two brake-cylinders on a car, two independent valves controlling the pressures in said cylinders respectively, a movable member exposed to the pressure in one of said cylinders, and a valve operatively connected to said member adapted to connect the other cylinder to atmosphere.

5. In an air-brake system, two brake-cylinders on a car, two independent valves controllable from a distance, each arranged to connect one of said cylinders to a source of pressure or to atmosphere, a movable member exposed to the pressure in one of said cylinders, and a valve operatively connected to said member adapted to connect the other cylinder to atmosphere.

6. In an air-brake system, two brake-cylinders on a car, an electrically-actuated valve controlling the pressure in one cylinder, a pneumatically-actuated valve controlling the pressure in the other cylinder, and means for releasing the pressure in the electrically-controlled cylinder upon the admission of pressure to the pneumatically-controlled cylinder.

7. In an air-brake system, two brake-cylinders on a car, an electrically-actuated valve controlling the pressure in one cylinder, a pneumatically-actuated valve controlling the pressure in the other cylinder, a movable member exposed to the pressure in the pneumatically-controlled cylinder, and a valve operatively connected to said member adapted to connect the electrically-controlled cylinder to atmosphere.

8. In an air-brake system, two brake-cylinders on a car, an electric-control system for one cylinder, a pneumatic-control system for the other cylinder, automatic means for rendering the pneumatic system inoperative when the electric system is in use, and automatic means for rendering the electrically-controlled cylinder inoperative when the pneumatically-controlled cylinder is in use to apply the brakes.

9. In an air-brake system, two brake-cylinders on a car, an electric-control system for one cylinder, a pneumatic-control system for the other cylinder, automatic means for rendering the pneumatic system inoperative when the electric system is in use, and automatic means for releasing the pressure in the electrically-controlled cylinder upon the admission of pressure to the pneumatically-controlled cylinder.

10. In an air-brake system, two brake-cylinders arranged back to back with their pistons connected to the same brake-rigging, a member extending through the backs of said cylinders and subjected to the differential pressures in said cylinders, and a valve carried by said member adapted to connect one of said cylinders to atmosphere.

11. In an air-brake system, two brake-cylinders back to back arranged with their pistons connected to the same brake-rigging, and a valve device arranged between the cylinders responsive to pressure in one cylinder and adapted to connect the other cylinder to atmosphere.

In witness whereof I have hereunto set my hand this 21st day of June, 1906.

GEORGE MACLOSKIE.

Witnesses:
BENJAMIN B. HULL,
HELEN ORFORD.